(12) United States Patent
Pestl

(10) Patent No.: US 10,966,375 B2
(45) Date of Patent: Apr. 6, 2021

(54) ANIMATED HANGING DEVICE

(71) Applicant: Forever Gifts, Inc., Arlington, TX (US)

(72) Inventor: Marcus Pestl, Dallas, TX (US)

(73) Assignee: Forever Gifts, Inc., Arlington, TX (US)

( * ) Notice: Subject to any disclaimer, the term of this patent is extended or adjusted under 35 U.S.C. 154(b) by 0 days.

(21) Appl. No.: 16/730,222

(22) Filed: Dec. 30, 2019

(65) Prior Publication Data

US 2020/0128758 A1    Apr. 30, 2020

Related U.S. Application Data

(63) Continuation-in-part of application No. 15/816,883, filed on Nov. 17, 2017, now Pat. No. 10,517,224.

(51) Int. Cl.
| | |
|---|---|
| *A01G 5/04* | (2006.01) |
| *F16M 13/00* | (2006.01) |
| *A47G 29/00* | (2006.01) |
| *A47G 7/04* | (2006.01) |
| *A47F 7/00* | (2006.01) |
| *F21V 21/28* | (2006.01) |
| *F16M 13/02* | (2006.01) |

(52) U.S. Cl.
CPC .............. *A01G 5/04* (2013.01); *A47G 29/00* (2013.01); *F16M 13/02* (2013.01); *F21V 21/28* (2013.01)

(58) Field of Classification Search
CPC ........... A01G 5/04; A47G 29/00; F16M 13/02
USPC ....... 248/339, 340, 301, 304, 307, 214, 215, 248/328; 211/117, 118, 119
See application file for complete search history.

(56) References Cited

U.S. PATENT DOCUMENTS

| | | | |
|---|---|---|---|
| 1,294,916 A | * | 2/1919 | Knight .............. A47H 7/02 211/103 |
| D70,831 S | | 8/1926 | Dlouhy |
| 3,204,908 A | | 9/1965 | Brown |
| D304,545 S | * | 11/1989 | Hurrelbrink .............. D8/373 |
| 5,607,131 A | | 3/1997 | Adams |
| 6,311,851 B1 | | 11/2001 | Knudsen, Sr. et al. |
| (Continued) | | | |

OTHER PUBLICATIONS

"#3100 Adjustable Over the Door Wreath Hanger Candle Holder," Country Primitive Gatherings: Handmade Primitive Gifts, copyright 2010-2017, 2 pages, accessed Nov. 17, 2017. http://www.countryprimitivegatherings.com/store/WsDefault.asp?One=3100.

*Primary Examiner* — Tan Le
(74) *Attorney, Agent, or Firm* — Kirby Drake

(57) ABSTRACT

A hanging device hangs a first decorative element such as a wreath, a display, or a sign, and incorporates a secondary decorative element enhanced with one or more of light, animation, motion detection, audio, and other effects powered by a power source and attached or fixed to the same decorative hanger. The hanging device may be a unitary, solid, and one-piece component, or incorporate an element that allows the height of the secondary decorative element to be adjusted relative to the first decorative element so that the second element may be suitably positioned relative to the first element. The hanging device may include an arm that may be arranged to stabilize the first element and second element that may be hanging from a supporting plane or surface. The hanging device may prevent the first element and the second element from damaging the supporting plane or surface.

20 Claims, 3 Drawing Sheets

(56) References Cited

U.S. PATENT DOCUMENTS

| | | | |
|---|---|---|---|
| 6,575,416 B1 * | 6/2003 | Avinger | A47G 25/0614 |
| | | | 248/215 |
| 6,708,832 B1 * | 3/2004 | Hannon | A47G 7/045 |
| | | | 182/187 |
| 6,857,608 B2 | 2/2005 | Avinger | |
| D568,727 S | 5/2008 | Walker | |
| 7,887,017 B2 | 2/2011 | Moran | |
| D702,540 S | 4/2014 | Kacines | |
| D708,932 S | 7/2014 | Fugett | |
| 8,905,573 B2 | 12/2014 | Sharrah et al. | |
| 8,955,808 B2 * | 2/2015 | Buschbach | F16M 13/02 |
| | | | 248/175 |
| 9,736,992 B1 | 8/2017 | Barry | |
| 2012/0181403 A1 * | 7/2012 | Lee | A47G 7/044 |
| | | | 248/225.21 |

* cited by examiner

ANIMATED HANGING DEVICE

CROSS-REFERENCE TO RELATED APPLICATION

The present Application is a continuation-in-part of U.S. patent application Ser. No. 15/816,883, filed Nov. 17, 2017, which is incorporated by reference herein in its entirety.

TECHNICAL FIELD

The disclosure relates generally to hangers. In particular, the disclosure relates to an ornamental animated hanging device.

BACKGROUND

Wreath hangers can be used to decorate doors and walls. Other hangers can support more than one decorative object but typically remain static and easily damage surfaces behind the hanger and decorative object. Further, hangers available for decorating surfaces can cause users to have some difficulty positioning decorative objects in a straight or evenly placed manner. Also, hangers do not satisfy growing consumer demand for decorative objects with interactive animated light, sound, motion, and other interactive effects.

SUMMARY

Embodiments of the present disclosure may provide a J-shaped hanging device that may be a unitary, solid, one-piece hanger. The hanging device may also be constructed from two or more separate elements that may be fastened together at their connected ends in such a way as to allow the overall height of the hanging device to be adjusted. The hanging device may include a hook located on its upper portion that may be provided to hang a first decorative element. The lower tip of the hanging device may support a second decorative element mounted to it. The first element may be a wreath or a decorative sign, and the second element may be a decoration incorporating various elements of light, sound, motion and other animated effects that may be triggered interactively by a motion sensor when a person approaches it. The first element may be any decorative object. The second element may be any decorative object with interactive and animated effects powered by a power source located on the hanging device. An arm may be attached to a bottom portion of the hanging device and may be fixed to the hanging device. The arm may be adjustable to a plurality of positions that stabilize the first decorative element and the second decorative element on the hanger. The arm may prevent any of the hanging device, the first decorative element, and the second decorative element from damaging the first surface behind the hanging device, and the hanging device may be hung from any of a portion of a first surface or a first supporting plane. The first surface or first supporting plane may be selected from any of an interior door, an exterior door, a wall, a fence, a gate, a pillar, a column, and a lamppost. The hanging device may provide a flexible strip or a pad that may be attached to the arm, and the flexible strip or pad may be lined with a material that may stick or adhere to a second surface of the first or second element that may be suspended from the hanging device. The hanging device may provide a flexible strip or a pad that may be attached to the arm, and the flexible strip or pad may be lined with a non-adhesive material that may grip the first surface. The hanging device may provide a flexible strip or a pad that may be attached to the arm, and the flexible strip or pad may be lined with a soft material.

Further embodiments of the present disclosure may provide a hanger that may include a seat that may be provided to support a first decorative element. The hanger may also include an upwardly curved element that may be provided to support a second decorative element. An adjustable arm may be attached to a bottom portion of the hanger and may stabilize the first element and the second element on the hanger. The hanger may be a unitary, solid, one-piece component. The hanging device may also be constructed from two or more separate elements that may be fastened together at their connected ends in such a way as to allow the overall height of the hanger to be adjusted. The first decorative element may be a wreath, and the second element may be an animated attachment with light, motion, sound and other interactive effects. The hanging device may be made of a material that may provide a weather resistant finish. The hanging device may provide an adjustable arm that may prevent the hanger, the first element, and the second element from damaging a first surface or supporting plane behind the hanger. The hanger may be hung from a portion of the first surface or a first plane, and the first surface or first plane may be selected from any of an interior door, an exterior door, a wall, a gate, a fence, a pillar, a column, and a lamppost. The hanging device may provide a flexible strip or pad that may be attached to the adjustable arm, and the flexible strip or pad may stick or adhere to a second surface of the first or second decorative element that may be suspended from the hanging device. The hanging device may include a knob that may be attached to the adjustable arm and may be arranged to move the adjustable arm relative to the hanging device and position the adjustable arm at different angles toward and away from the second surface of one or more of the elements suspended from the hanging device. The knob may be a knurled screw knob that may tighten the adjustable arm onto the hanging device and may fixedly anchor the adjustable arm in a desired position relative to the hanging device.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides an ornamental animated hanging device that may be a unitary, solid, and one-piece component. In particular, the present disclosure relates to an ornamental animated hanging device, such as a wreath or lantern hanger, that may provide an arm that may prevent the hanger, lantern, and/or wreath from damaging doors and walls and may brace the hanging device so it does not swing when surfaces or planes from which it may be hung from are opened.

Figure 1:
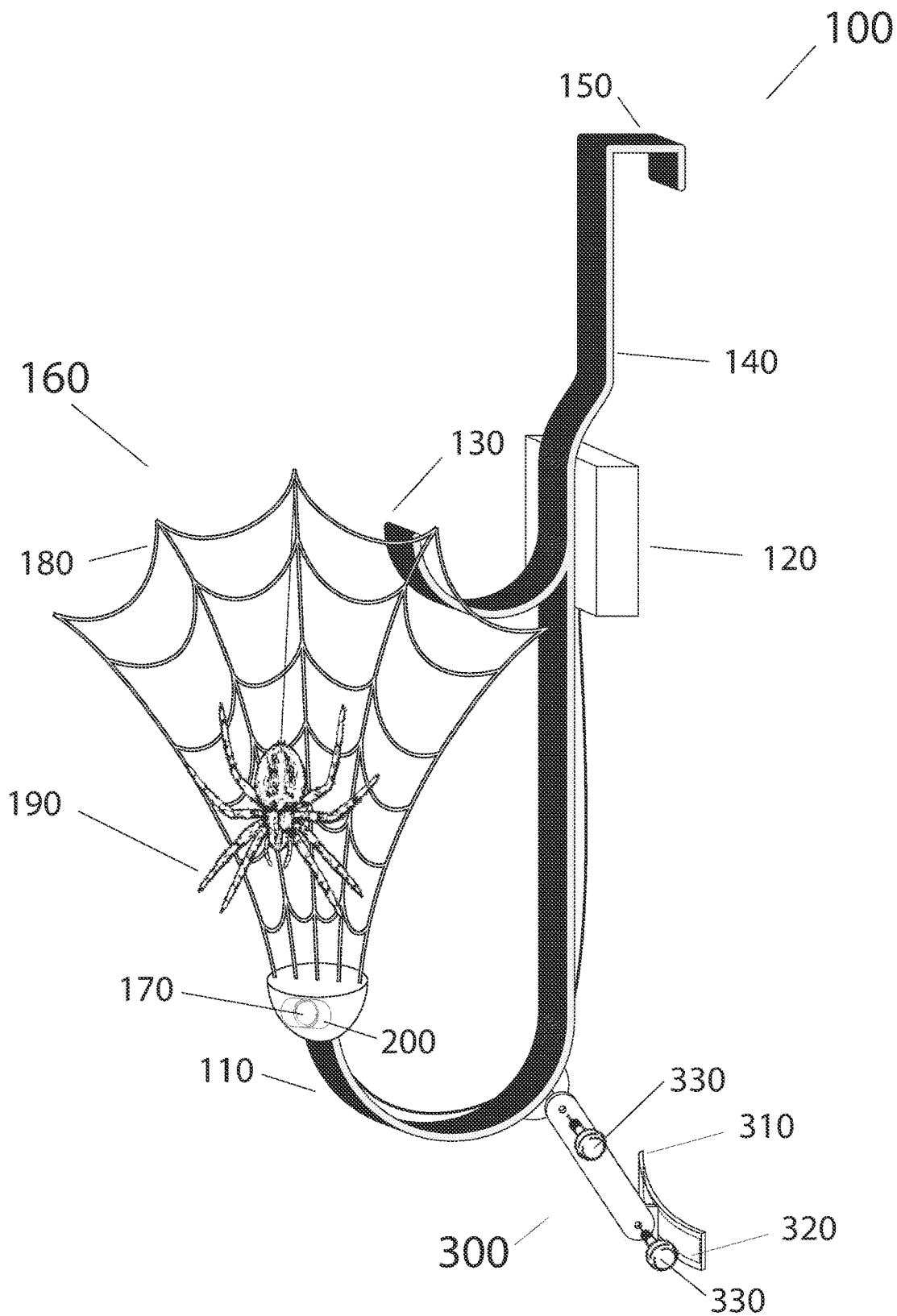
FIG. 1 is a perspective view of a hanging device including one decorative element according to an embodiment of the present disclosure.

FIG. 1 depicts hanging device 100 according to an embodiment of the present disclosure. Hanging device 100 may be a unitary, solid, and one-piece component that may include a mounted animated decorative element 160, power source 120, hook 130, bracket 140, and support 150. Hanging device 100 may be a combined animated ornamental wreath hanger, in which wreath (FIG. 3) may be supported by and hung from hook 130 and animated decorative element (FIGS. 1-3) may both be mounted to the upturned tip 110 of bracket 140. Bracket 140 may curl or bend upward and may provide a mounting surface at its tip for mounting a first decorative element 160. It should be appreciated that the first decorative element may be an animated figure, such as prelit spider 190 that travels up and down web 180 when motion is detected by motion sensor 170 and emits sound from speaker 200, or any other such similar animated decorative element with sounds, lights, motion, and other interactive effects triggered by motion sensor 170 without departing from the present disclosure. Such effects as disclosed by animated decorative element 160 may be powered by any of an attached power source such as battery box 120 mounted to bracket 140 or an external power source that animated decorative element may be plugged into, or any other similar sources of power such as a solar panel that stores power in a rechargeable battery where both solar panel and rechargeable battery may be may be mounted to bracket 140 without departing from the present enclosure. It should be appreciated that hanging device 100 may provide spacing for a decorative element (not shown) that may frame or center around the animated decorative element 160 mounted on hook tip 110. It should be appreciated that the decorative element (not shown) may be wreath 380 (FIG. 3), or any other decorative object such as suitably frames or visually complements animated decorative element 160 without departing from the present disclosure.

Hanging device 100 may be hung from a first surface or plane without requiring any tools for attachment and/or adjustment against said first surface. Hanging device 100 may include screw holes or require means of being secured to the first surface (not shown). It should be appreciated that screw holes or means of securing hanging device 100 to the first surface may not be required without departing from the present disclosure. It should be appreciated that the first surface may include, but is not limited to, interior and exterior doors, walls, fences, gates, rods, columns and additional types of horizontal and vertical surfaces, planes and supportive members, whether curved or flat.

Arm 300 may be detachably or permanently affixed to a bottom portion of hanging device 100 and may stabilize hanging device 100, animated decorative element 160, and other decorative elements (not shown) that may be provided in a plurality of sizes and shapes. Arm 300 may stabilize hanging device 100, animated decorative element 160, and other decorative elements and may prevent hanging device 100 from damaging a first surface that may be provided behind hanging device 100, such as interior and exterior doors, walls, fences, gates, pillars, columns, lampposts, and additional types of surfaces. For example, arm 300 may be positioned to prevent hanging device 100 and/or any parts of decorative element 160 (FIGS. 1-3) and wreath 380 (FIG. 3) that may be attached to hanging device 100 from rubbing or scraping the first surface and/or a second surface of structure that may be used to suspend, hang or support hanging device 100, including surfaces of the hanging device 100 itself. It should be appreciated that arm 300 may be an adjustable arm that may rotate to a desired angle relative to hanging device 100. It should further be appreciated that arm 300 may be fixed and may not rotate.

Flexible strip or pad 310 may attach to arm 300. Flexible strip or pad 310 may be lined on a facing side of flexible strip or pad 310 with replaceable adhesive strip 320. It should be appreciated that the facing side of flexible strip or pad 310 may face a first surface to which hanging device 100 may be secured. On its outward facing side flexible strip or pad 310 may be constructed from or lined with a material that provides grip when it contacts with a first surface from which hanging device 100 may hang, or be secured to. It should further be appreciated that replaceable adhesive strip 320 may adhere to an available portion of any first or second element that may be suspended from hanging device 100. Flexible strip or pad 310 may be connected to arm 300 by incorporating an articulated joint which may allow adhesive strip 320 to be positioned to provide surface area contact with an available portion of the first and/or the second element that may be suspended from hanging device 100. It should be appreciated that adhesive strip 320 may be positioned to provide greater surface area contact with the available portion of the first and/or the second element compared to other systems that do not utilize arm 300. Knob 330 may attach arm 300 to bracket 140 and may adjust and fix arm 300 at various angles relative to hanging device 100. It should be appreciated that knob 170 may be a knurled screw knob in an embodiment of the present disclosure; however, other types of knobs, connectors and handles may adjust and fix arm 300 in a variety of positions relative to hanging device 100 without departing from the present disclosure.

Figure 2:
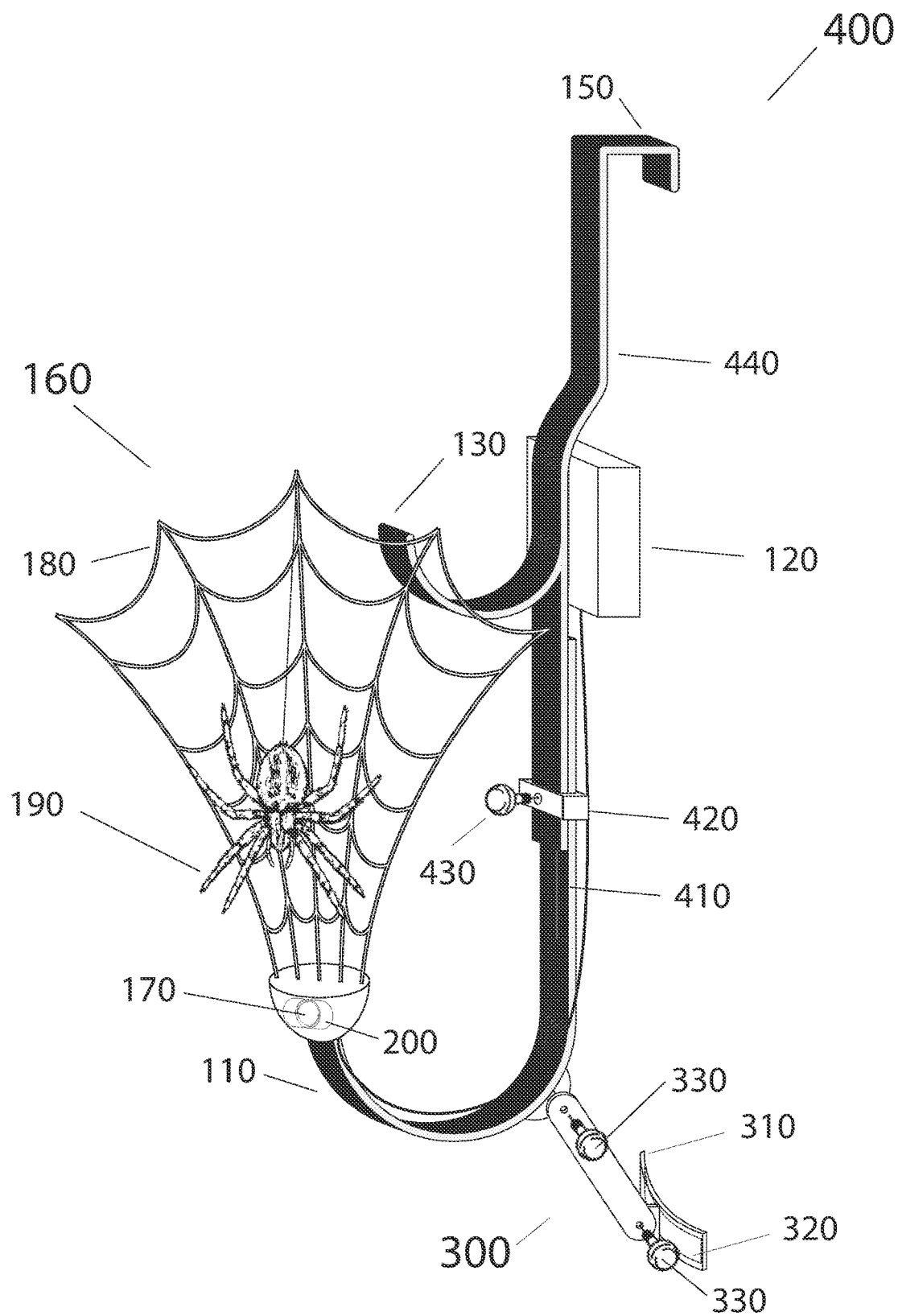
FIG. 2 is a perspective view of an adjustable hanging device including one decorative element according to an embodiment of the present disclosure.
Figure 3:
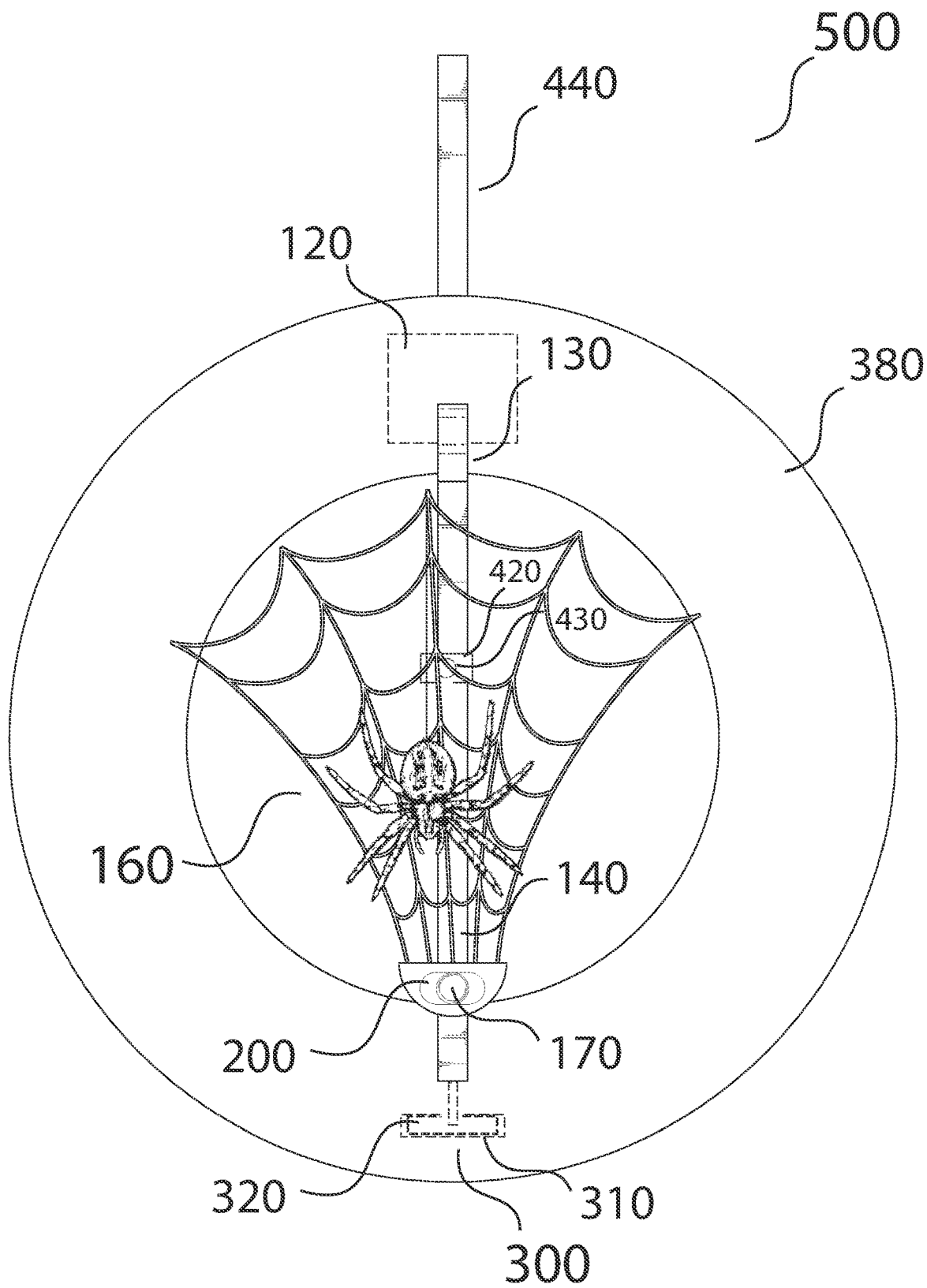
FIG. 3 is an elevation view of a hanging device including one decorative element according to an embodiment of the present disclosure.

FIG. 2 depicts animated ornamental lantern hanger 400 according to an embodiment of the present disclosure. Animated ornamental lantern hanger 400 may provide hanging device 100 (FIG. 1) that may include hook 130, upper bracket 440, lower bracket 410, fastening clamp 420, screw knob 430, power source 120, arm 300, and support 150. In this embodiment, a lower portion of upper bracket 440 overlaps an upper portion of lower bracket 410, and these overlapping portions may be enclosed by a fastening clamp 420 and secured against movement or slippage by way of screw knob 430. It should be appreciated that loosening and tightening screw knob 430 allows the overlapping ends of upper bracket 440 and lower bracket 410 to slide over each other and allows the position of animated decorative element 160 to be adjusted relative to hook 130. In this way animated decorative element 160 may be adjusted to a more visually pleasing position relative to wreath 380 (FIG. 3). Animated decorative element 160 may be mounted to an upturned end of lower bracket 410. It should be appreciated that the second element or the another decorative element supported by hook 130 may be wreath 380 (FIG. 3), or another decorative element (not shown) in an embodiment of the present disclosure.

FIG. 3 depicts ornamental animated wreath hanger 500 according to an embodiment of the present disclosure. Ornamental animated wreath hanger 500 may provide hanging device 100 (FIG. 1) that may include hook 130, upper bracket 440, lower bracket 410, fastening clamp 420, screw knob 430, power source 120, arm 300, and support 150. Animated decorative element 160 may be secured to ornamental animated wreath hanger 500 by mounting on upturned tip of lower bracket 410 (FIG. 2) or upturned tip of bracket 140 (FIG. 1). Wreath 380 may be secured to ornamental animated wreath hanger 500 by hanging from hook 130 (FIGS. 1, 2) of hanging device 100 in embodiments of the present disclosure.

In embodiments of the present disclosure, arm 300 and flexible strip 310 (FIGS. 1, 2) may be angled to face away relative to hanging device 100 and may secure adjustable adhesive or grip strip 320 to an available portion of the first and/or second surface or plane that hanging device 100 may hang from or be supported by.

It should be appreciated that hanging device 100 may be hung from a round post, and arm 300 may be angled toward the rear of hanging device 100. Adjustable adhesive strip 320 may wrap onto a first surface which may be in the form of a curved surface of the round post and may prevent hanging device 100 from slipping off the round post.

In further embodiments of the present disclosure, arm 300 may be angled to face rearward, and flexible strip or pad 190 may include a self-adhesive foam strip that may be customized to match dimensions of flexible strip or pad 190. The self-adhesive foam strip may prevent hard surfaces of hanging device 100 from scraping surfaces of doors from which hanging device 100 may be suspended.

In embodiments of the present disclosure, hanging device 100 may have any height that may be proportional to a first surface including, but not limited to, an interior door, an exterior door, and/or a vertical surface. The vertical surface may include, but is not limited to walls, gates, pillars, columns, lampposts, and fences. For example, hanging device 100 may provide a height that may be approximately ¼ of a height of a door. It should be appreciated that the height of hanging device 100 may be more or less than approximately ¼ the height of the door without departing from the present disclosure. Hanging device 100 may have a height of approximately 14 inches and a depth of approximately 8 inches. It should be appreciated that hook 130 may have a longest length that may be approximately 2.5 inches. It should be appreciated that support 150 may have a longest length that may be approximately 1.5 inches. It should be appreciated that bracket 140 (FIGS. 1, 2) and upper bracket 440 and lower bracket 410 in combination may have a longest length that may be approximately 24 inches and a shortest length of approximately 18 inches. It should be appreciated that power source 120 may contain any type of electrical storage device such as a plurality of batteries or may generate its own power by way of including a solar panel (not shown) in combination with a plurality of rechargeable batteries that store electricity generated for use by the solar panel. It should be appreciate that the animated decorative element may be connected to power source 120 and that power source 120 may be located separately to bracket 140 (FIGS. 1, 2) and upper bracket 440 whether permanently attached or removable from bracket 140 (FIGS. 1, 2) and upper bracket 440. It should be appreciated that animated decorative element 160 may be powered by any of a lead wire and a plug (not shown) connected or plugged into a mains electrical supply. It should be appreciated that the lower portion of upper bracket 440 overlaps an upper portion of lower bracket 410 by a maximum length of approximately 6 inches, and these overlapping portions are enclosed and fastened together by other means than a fastening clamp 420 and secured against movement or slippage by way of screw knob 430, without departing from the scope of the present disclosure. It should be appreciated that other dimensions and proportions may be utilized for specific decorative applications of hanging device 100. It should further be appreciated that hanging device 100 may have dimensions that may be more than or less than the dimensions provided herein without departing from the present disclosure. It should be appreciated that animated decorative element 160 may include a plurality of combinations of interactive and special effects such as, but not limited to, sound, light, motion, smell, atmospheric, magnetic, electronic, gravitational, kinetic and other effects such as may be known or apparent to those skilled in the art.

It should be appreciated that hanging device 100 and animated decorative element 160 may include any of a weather-resistant finish or a weather-resistant material. It should be appreciated that hanging device 100 may utilized as an over-the-door hanger. It should be appreciated that hanging device 100 may be utilized to decorate a front door, a back door, a wall, and/or any additional elements that may be enhanced or decorated with hanging device 100. Additional elements may include, but are not limited to, pillars, columns, fences, gates, and lampposts. It should be appreciated that screw holes may be provided in hanging device 100 without departing from the present disclosure; however, screw holes may not be required to secure hanging device 100 in embodiments of the present disclosure. It should be appreciated that hanging device 100 may be constructed from a flat metal material and/or made from any material(s) that may provide strength to support the weight of elements suspended from hanging device 100. It should further be appreciated that materials utilized to construct hanging device 100 may include, but are not limited to, wood, metal pipes and rods, plastics, reinforced cloths and fibers, and other materials without departing from the present disclosure.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A hanging device comprising:
   an upper portion;
   a support located on the upper portion of the hanging device, the support provided to hang the hanging device from a first surface;
   a hook located on the upper portion of the hanging device provided to hang a first decorative element, wherein the first decorative element is a wreath or a decorative sign;
   a lower portion fastened to the upper portion so that the overall height of the hanging device is adjustable, wherein the lower portion receives a second decorative element incorporating one or more elements of light, sound, motion and other animated effects; and
   an adjustable arm attached to the lower portion, wherein the adjustable arm is adjustable to a plurality of positions to stabilize the first decorative element and the second decorative element on the hanging device, and prevents the hanging device, the first decorative element, and the second decorative element from damaging the first surface behind the hanging device when the hanging device is hung from the first surface, wherein no tools are used for attachment and/or adjustment of the hanging device against or to the first surface.

2. The hanging device of claim 1 wherein the one or more elements of light, sound, motion and other animated effects of the second decorative element are triggered by a motion sensor when a person approaches the second decorative element.

3. The hanging device of claim 1 further comprising a power source that powers the second decorative element.

4. The hanging device of claim 1, wherein the first surface is selected from an interior door, an exterior door, a wall, a fence, a gate, a pillar, a column, and a lamppost.

5. The hanging device of claim 1 further comprising:
a flexible strip or a pad attached to the adjustable arm, wherein the flexible strip or pad is lined with a material that sticks or adheres to a second surface suspended from the hanging device.

6. The hanging device of claim 1 further comprising:
a flexible strip or pad attached to the adjustable arm, wherein the flexible strip or pad is lined with a non-adhesive material that grips the first surface.

7. The hanging device of claim 1 further comprising:
a flexible strip or pad attached to the adjustable arm, wherein the flexible strip or pad is lined with a soft material.

8. A hanger comprising:
a seat that supports a first decorative element;
an upwardly curved element that supports a second decorative element;
an adjustable arm attached to a bottom portion of the hanger to stabilize the first decorative element and the second decorative element on the hanger, wherein the adjustable arm prevents the hanger, the first decorative element, and the second decorative element from damaging a first surface behind the hanger when the hanger is hung from a portion of the first surface,
wherein the hanger is a structurally integral, unitary, solid, one-piece component,
wherein no tools are used for attachment and/or adjustment of the hanger against or to the first surface, and
wherein the hanger positions the second decorative element central to the first decorative element on the hanger.

9. The hanger of claim 8, wherein the first decorative element is a wreath.

10. The hanger of claim 8, wherein the second decorative element is a animated attachment with light, motion, sound and other interactive effects.

11. The hanger of claim 10, wherein the light, motion, sound and other interactive effects of the second decorative element are triggered by a motion sensor when a person approaches the second decorative element.

12. The hanger of claim 8, wherein the hanger is made of a material that provides a weather-resistant finish.

13. The hanger of claim 8, wherein the first surface is selected from an interior door, an exterior door, a wall, a gate, a fence, a pillar, a column, and a lamppost.

14. The hanger of claim 8 further comprising:
a flexible strip or pad attached to the adjustable arm.

15. The hanger of claim 8 further comprising:
a knob attached to the adjustable arm and arranged to move the adjustable arm relative to the hanger and position the adjustable arm at different angles.

16. The hanger of claim 15, wherein the knob is a knurled screw knob that tightens the adjustable arm onto the hanger and fixedly anchors the adjustable arm in a desired position relative to hanger.

17. A hanger comprising:
a seat that supports a first decorative element;
an upwardly curved element that supports a second decorative element;
a support that hangs the hanger from a first surface;
an adjustable arm attached to a bottom portion of the hanger to stabilize the first decorative element and the second decorative element on the hanger, wherein the adjustable arm prevents the hanger, the first decorative element, and the second decorative element from damaging the first surface behind the hanger when the hanger is hung from the first surface,
wherein the hanger is constructed from two separate elements fastened together to allow the overall height of the hanger to be adjusted,
wherein no tools are used for attachment and/or adjustment of the hanger against or to the first surface, and
wherein adjusting the height of the hanger allows the hanger to position the second decorative element central to the first decorative element on the hanger.

18. The hanger of claim 17, wherein the first decorative element is a wreath.

19. The hanger of claim 17, wherein the second decorative element is an animated attachment with light, motion, sound and other interactive effects.

20. The hanger of claim 19, wherein the light, motion, sound and other interactive effects of the second decorative element are triggered by a motion sensor when a person approaches the second decorative element.

* * * * *